United States Patent [19]

Gay

[11] 4,146,282
[45] Mar. 27, 1979

[54] VEHICLE BATTERY ACCESSORY DEVICE

[76] Inventor: David E. Gay, 6215 W. Broadway, Richmond, Ill. 60071

[21] Appl. No.: 830,427

[22] Filed: Sep. 6, 1977

[51] Int. Cl.² .......................................... H01R 39/00
[52] U.S. Cl. ................................ 339/5 RL; 339/10; 339/95 B
[58] Field of Search .................. 339/5 RL, 5 R, 5 M, 339/5 P, 5 S, 2 RL, 10, 95 B, 152, 263 B

[56] References Cited
U.S. PATENT DOCUMENTS

| | | | |
|---|---|---|---|
| 2,234,630 | 3/1941 | Fullington | 339/95 B |
| 3,409,246 | 11/1968 | De Pas | 339/5 RL |
| 3,813,632 | 5/1974 | Drewry | 339/10 |

Primary Examiner—Roy Lake
Assistant Examiner—DeWalden W. Jones
Attorney, Agent, or Firm—Robert D. Farkas

[57] ABSTRACT

A vehicle battery accessory apparatus utilizes a first pair of electrical conductors, having the first ends thereof provided with clamps suitable for convenient coupling to the terminals of the battery, a storage reel upon which the major length of a second pair of electrical conductors may be stored, and a brush and commutating arrangement to electrically couple the second pair of electrical conductors and the first pair of electrical conductors together, the second pair of electrical conductors being provided with electrical connectors of the clamping type and an insulating bar having a pair of lugs thereon such that the bar is provided with lugs for retaining the electrical clamping connectors in a stored non-shorting condition when the apparatus is not in use. Both the storage reel journalled to a rod, and the bar are provided with mounting surfaces that can be affixed to an interior conveniently accessible portion of the vehicle permitting thereby, easy and convenient electrical connection to the vehicle bar by withdrawing the second pair of electrical conductors from the storage position on the reel by exerting a force on the free ends of the second pair of electrical conductors. A spring urges the reel in one direction of rotation such that the second pair of electrical conductors may be wound up on the reel when the second pair of electrical conductors are not in use.

7 Claims, 4 Drawing Figures

VEHICLE BATTERY ACCESSORY DEVICE

BACKGROUND OF THE INVENTION

1. The Field of the Invention

This invention relates to motor vehicle battery accessory devices and more particularly to that class of apparatus utilized to attain electrical access to the vehicle battery on motor vehicles having their batteries installed in relatively inaccessible locations.

2. Description of the Prior Art

The prior art abounds with motor vehicles having batteries and removable electrical conducting devices adapted to the batteries. Though cable reels are well known in the art, a class of cable reel adapted for temporary and infrequent use, having a compact construction and particularly suited for mounting to the motor vehicle and coupled to the vehicle's battery are unknown.

SUMMARY OF THE INVENTION

A primary object of the present invention is to provide a storage device for electrical conductors adapted to be connected to the battery of a motor vehicle having one end of the conductors provided with electrical clamping devices.

Another object of the present invention is to provide a cable reel storage unit in compact and of efficient design which can be easily mounted to an interior surface of the vehicle.

Still another object of the present invention is to provide storage means for mounting the free ends of the cable connected to the vehicle battery such that the clamping devices will not short together.

Yet another object of the present invention is to provide an inexpensive and easily fabricated device in kit form adapted for the purposes and objects thereof.

Many small motor vehicles usually of the type in which the engine is instaalled in a rear trunk-like compartment, have the battery of the vehicle installed in a relatively inaccessible location. Such motor vehicles, when the battery runs down, require a boost from an external battery, but the user in attempting to connect the booster cables to the vehicle battery finds it exceptionally difficult to reach the inaccessible vehicle battery. In likewise fashion, such motor vehicles are inconvenient to use as a battery supply to provide boosting current to other motor vehicles. The present invention recognizes these difficulties and provides an electrical harness coupled to the inaccessible terminals of the battery and hving an end thereof located at a convenient point in the vehicle such that the end may be easily withdrawn therefrom.

These objects, as well as other objects of the present invention, will become more readily apparent after reading the following description of the accompanying drawings.

DESCRIPTION OF THE PREFERRED EMBODIMENT

The structure and method of fabrication of the present invention is applicable to a kit of parts adapted to be installed in a compartment or interior portion of the vehicle such that one end of the first pair of electrical conductors is permanently attached to the terminals of the vehicle battery and a free end of another pair of electricl conductors coupled to the first pair of electrical conductors, are readily accessible by withdrawing the free ends of the second pair of conductors from a storage position on a reel similarly mounted in the motor vehicle. Spring biasing of the reel facilitates storage of the second pair of electrical conductors on the reel. A mounting bar is provided such that the free ends of the second pair of electrical conductors, having electrical connectors attached thereto may be secured to the bar when the apparatus is not in use. An insulating projection prevents accidentical contacting of the clamps at the free ends of the second pair of electrical conductors. Insulation is also provided surrounding the electrical clamping devices. The free end of the first pair of electrical conductors may be provided with battery clamps for fastening to the terminals of the vehicle. A plate, fabricated from an insulating material, is provided with mounting means such that the plate may be fastened to the interior portion of the motor vehicle. A pair of electrically conducting washers are secured within a pair of concentrically aligned grooves disposed in an upper surface of the plate. The reel is provided with a pair of brushes adapted to engage the annular washers and electrically contacting the other end of the second pair of electrical conductors. The other end of the first pair of electrical conductors is connected to the annular washers. Thus, all of the length of the second pair of electrical conductors may be stored on to the reel with the remaining free end portions clamped onto the lugs fastened on the bar. The length of the first pair of electrical conductors is disposed within the compartment of the motor vehicle such that the first pair of electrical conductors extend from the terminal of the vehicle battery to the location of the motor vehicle where the insulating plate is secured.

Figure 1:
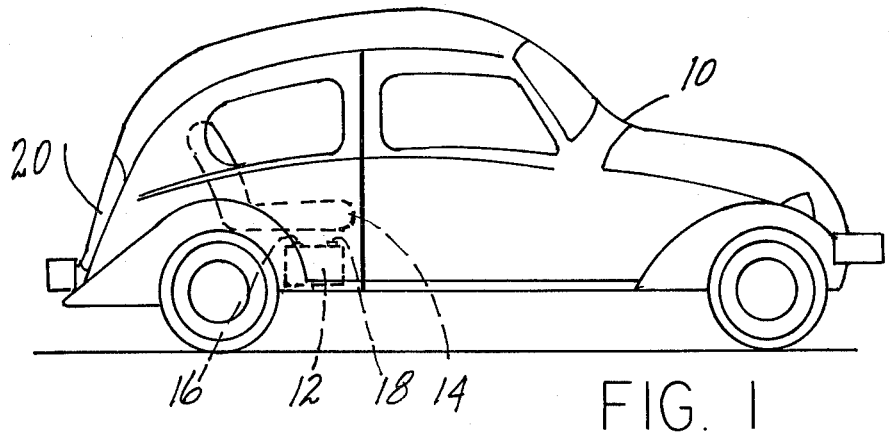
FIG. 1 is a perspective view of a motor vehicle to which the present invention may be installed.

Now referring to the Figures, and more particularly to the embodiment illustrated in FIG. 1 showing a motor vehicle 10 having a battery 12 and a seat 14. The battery is disposed secured to the motor vehicle beneath the seat such that the terminals 16 and 18 of the battery are inaccessible from the rear hatch 20 of the vehicle.

Figure 2:
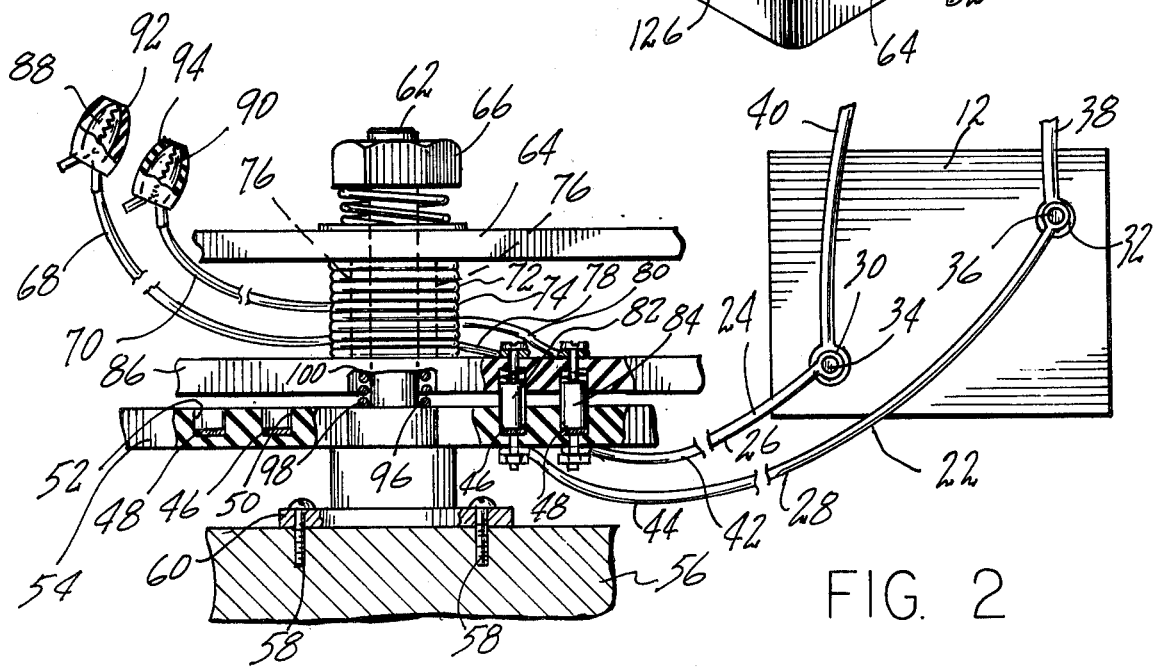
FIG. 2 is a partial side elevation view of the present invention shown installed on a mounting surface and coupled to a battery.

FIG. 2 illustrates battery 12 to which ends 22 and 24 of a first pair of electrical conductors 26 and 28, respectively are coupled utilizing battery clamps 30 and 32 to battery terminals 34 and 36. Main vehicle battery cables 38 and 40 are utilized in the operation of a motor vehicle, now shown. Ends 42 and 44 of conductors 26 and 28 are coupled to electrical conducting washers 46 and 48, shown installed in grooves 50 and 52 of insulating plate 54. Insulating plate 54 is secured to a mounting surface 56 by having screws 58 engage therewith. The screws are fastened to plate 60, shown secured to insulating plate 54. Rod 62 is shown secured to insulating plate 54. Reel 64 is journalled to rod 62 and is secured thereto by nut 66. Nut 66 is shown threaded on the uppermost free end of rod 62. A second pair of electrical conductors 68 and 70 have portions 72 and 74 thereof wrapped around a central portion of spool 64 defined by dotted lines 76. Ends 78 and 80, of conductors 68 and 70 are secured to brushes 82 and 84 projecting downwardly from the lowermost plate 86 of reel 64. The lowermost end of brushes 82 and 84 engage washers 46 and 48 such that reel 64 may fully rotate about rod 62. Electrical clamps 88 and 90 are installed at the free ends of electrical conductors 68 and 70. Electrical clamps 88 and 90 are shown covered by insulating covers 92 and 94. The distal ends of conductors 68 and 70 are free to pull outwardly from the storage portions 72 and 74 by rotating wheel 64. When this is done, helical spring 96 is tensioned because end 98 of the spring is fastened to plate 54, whilst end 100 of spring 96 is fastened to reel 64. When electrical connectors 88 and 90 are released, spring 96 causes reel 64 to wind up in an opposite direction so as to cause stored portions 72 and 74 of conductors 68 and 70 to store onto the core of reel 64.

Figure 3:
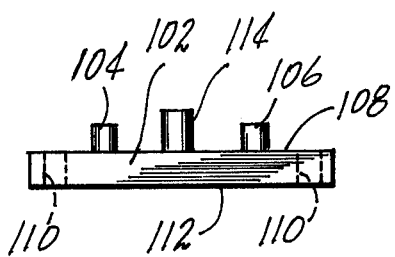
FIG. 3 is a side elevation view of a portion of the present invention.

FIG. 3 illustrates a bar 102 having a pair of lugs 104 and 106 on one exterior surface 108 thereof. Clearance holes 110 are provided for fastening surface 112 of bar 102 to a mounting surface, not shown. Protrusion 114 is shown located on surface 108 and is disposed intermediate lugs 104 and 106. The distance separating the exterior surface of lug 104 and an adjacent surface of protrusion 114 and the distance separating the exterior surface of lug 106 and an adjacent surface of protrusion 114 is adapted to accommodate either electrical connector 88 and 90, s shown in FIG. 2.

Figure 4:
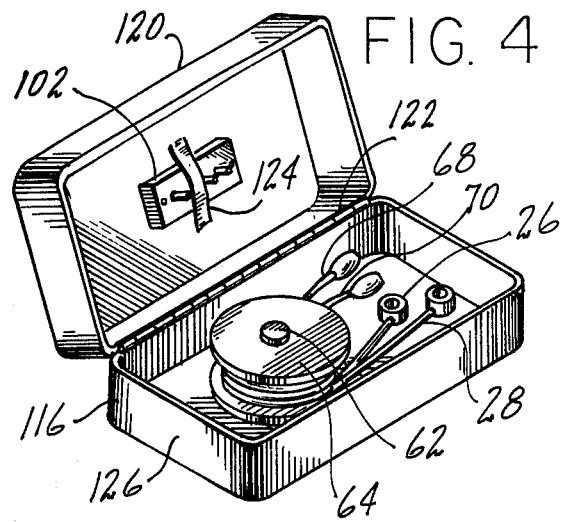
FIG. 4 is a perspective view of the present invention shown stored within a container.

FIG. 4 illustrates container 116 having lid 120 hingably secured thereto by way of hinge 122. A clamp 124 is provided to facilitate convenient mounting of bar 102 to an interior surface of lid 120. Reel 64, rod 62, conductors 68 and 70, and conductors 26 and 28 are shown stored within body portion 126 of container 116.

One of the advantages of the present invention is a storage device for electrical conductors adapted to be connected to the battery of a motor vehicle having one end of the conductors provided with electrical clamping devices.

Another advantage of the present invention is a cable reel storage unit in compact and of efficient design which can be easily mounted to an interior surface of the vehicle.

Still another advantage of the present invention is storage means for mounting the free ends of the cable connected to the vehicle battery such that the clamping devices will not short together.

Yet another advantage of the present invention is an inexpensive and easily fabricated device in kit form adapted for the purposes and objects thereof.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. In the combination of a motor vehicle, said motor vehicle having a battery mounted thereon, the improvement comprising a first pair of electrical conductors, a pair of concentrically aligned circular washers, one of said washers having a smaller outside diameter than the inside diameter of the other of said washers, a plate, said plate being fabricated from an insulating material, said plate having a pair of circular annular grooves therein, one of said pair of annular grooves having a smaller outside diameter than the inside diameter of the other of said pair of annular grooves, said pair of annular grooves being concentrically aligned with one another and located in an upper surface of said plate, said one of said pair of washers disposed fixedly secured in said one of said pair of grooves, said other of said pair of washers disposed fixedly secured in said other of said pair of grooves, means to secure said plate to a surface of said motor vehicle, a rod, said rod fixedly secured to said plate, said rod extending upwardly above said plate and coaxially aligned with said concentric pair of washers, one end of said first pair of conductors electrically coupled to said washers, a reel, said reel rotatably journalled to said rod and located above said plate, means to bias said reel in one direction of rotation relative to said plate, a pair of brushes, each of said pair of brushes extending downwardly from said reel and individually electrically coupled to each of said pair of washers respectively, a second pair of conductors, one end of each of said pair of second conductors electrically individually coupled to each of said brushes respectively, the other end of each said pair of second conductors individually electrically coupled to each of a pair of electrical clamps respectively, said pair of electrical clamps having a covering fabricated from an insulated material, means to prevent said reel from manual disengagement from said rod.

2. The apparatus as claimed in claim 1 further comprising a terminal strip, said terminal strip including a bar, said bar fabricated from an insulating material, means to fixedly secure said bar to an interior portion of said motor vehicle, a pair of legs, said pair of legs fixedly secured to one exterior surface of said bar, said pair of legs having a diameter adapted to accommodate said pair of electrical clamps when engaged thereon.

3. The apparatus as claimed in claim 2, further comprising a container, said container having a lid, said plate and said rod and said reel and said first plate of electrical conductors and said second pair of electrical conductors and said bar being disposed removably secured within said container.

4. The apparatus as claimed in claim 1 further comprising a pair of battery terminal clamps, said pair of battery terminal clamps electrically coupled to the other end of said first pair of electrical conductors.

5. The apparatus as claimed in claim 2 wherein said plate and said reel and said rod and said first pair of electrical conductors and said second pair of electrical conductors and said bar are installed on an interior surface of said vehicle, said other end of said first pair of electrical conductors being disposed electrically coupled to said battery, said bar being installed on said interior surface a distance from said reel wherein substantially all of the length of said second pair of electrical conductors is installed wrapped around said reel.

6. The apparatus as claimed in claim 1 wherein said biasing means comprises a helical spring, one end of said helical spring fixedly secured to said plate, the other end of said helical spring fixedly secured to the lower surface of said reel, said helical spring being disposed coaxially aligned with said rod and wrapped there-around.

7. The apparatus as claimed in claim 2 further comprising a protrusion, said protrusion disposed on one exterior surface of said bar, said protrusion located intermediate said pair of legs.

* * * * *